United States Patent [19]

Tah-sun

[11] 3,994,629

[45] Nov. 30, 1976

[54] MECHANISM FOR TAPPING THE SURF ENERGY

[76] Inventor: Lin Tah-sun, 3rd Fl., 146 Chang Chun Road, Taipei, China /Taiwan

[22] Filed: Nov. 18, 1974

[21] Appl. No.: 524,714

[52] U.S. Cl. .............................. 417/329; 417/330; 60/640
[51] Int. Cl.² .................... F03B 15/14; F04B 17/00
[58] Field of Search ............. 417/329, 330; 60/640; 185/32, 27; 290/53, 42

[56] References Cited
UNITED STATES PATENTS

| | | |
|---|---|---|
| 562,721 | 6/1896 | Garrett .............................. 417/329 |
| 1,045,654 | 11/1912 | Willy................................. 417/330 |
| 1,754,399 | 4/1930 | Pascucci ............................ 417/329 |

*Primary Examiner*—Carlton R. Croyle
*Assistant Examiner*—Thomas I. Ross

[57] ABSTRACT

A mechanism utilizing the energy of the surf including a gravitational bucket with a rack on the outside thereof. The rack engages a gear which drives a reciprocating water pump. The pump transports water to a tank for use later as a source of steady controllable energy.

4 Claims, 3 Drawing Figures

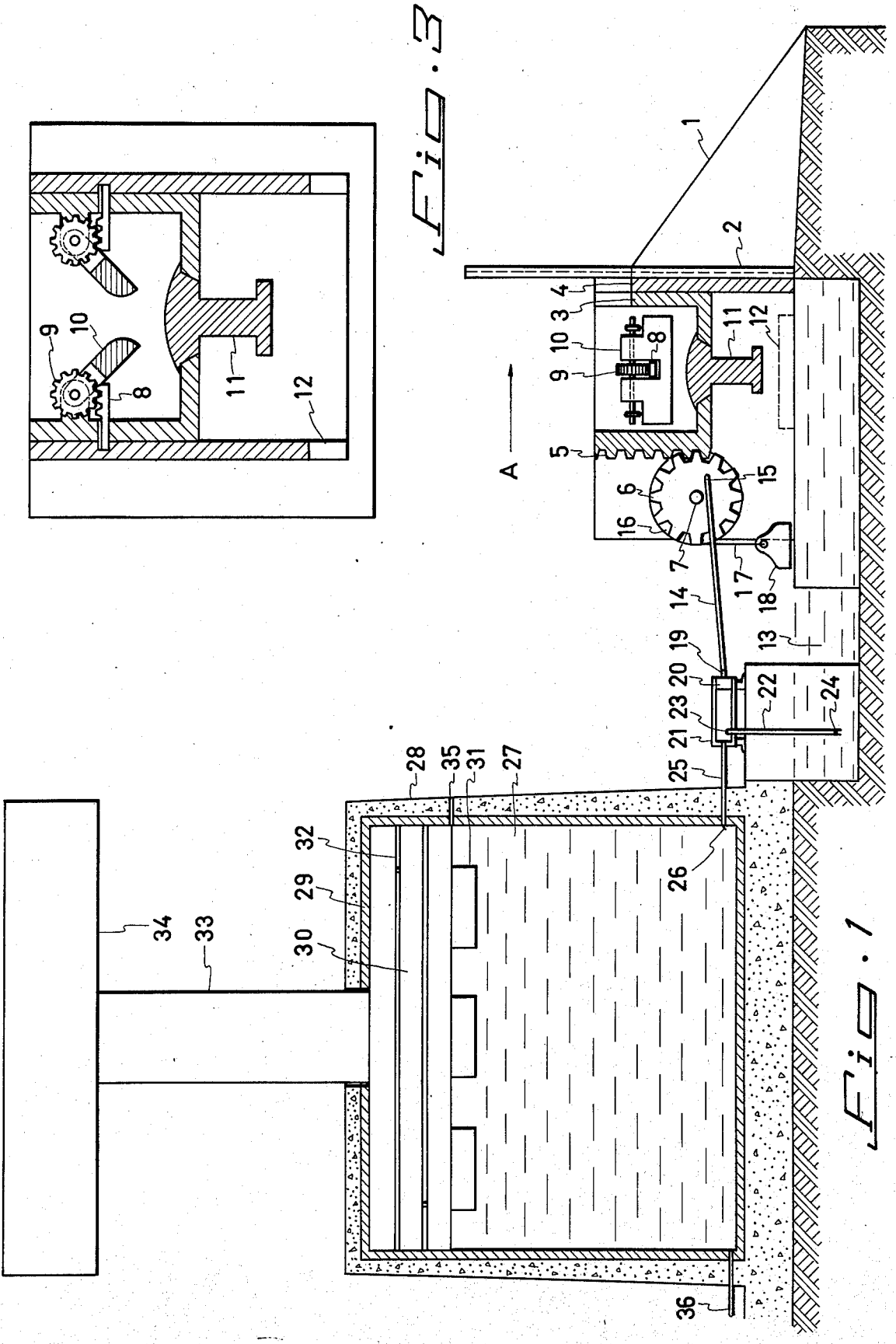

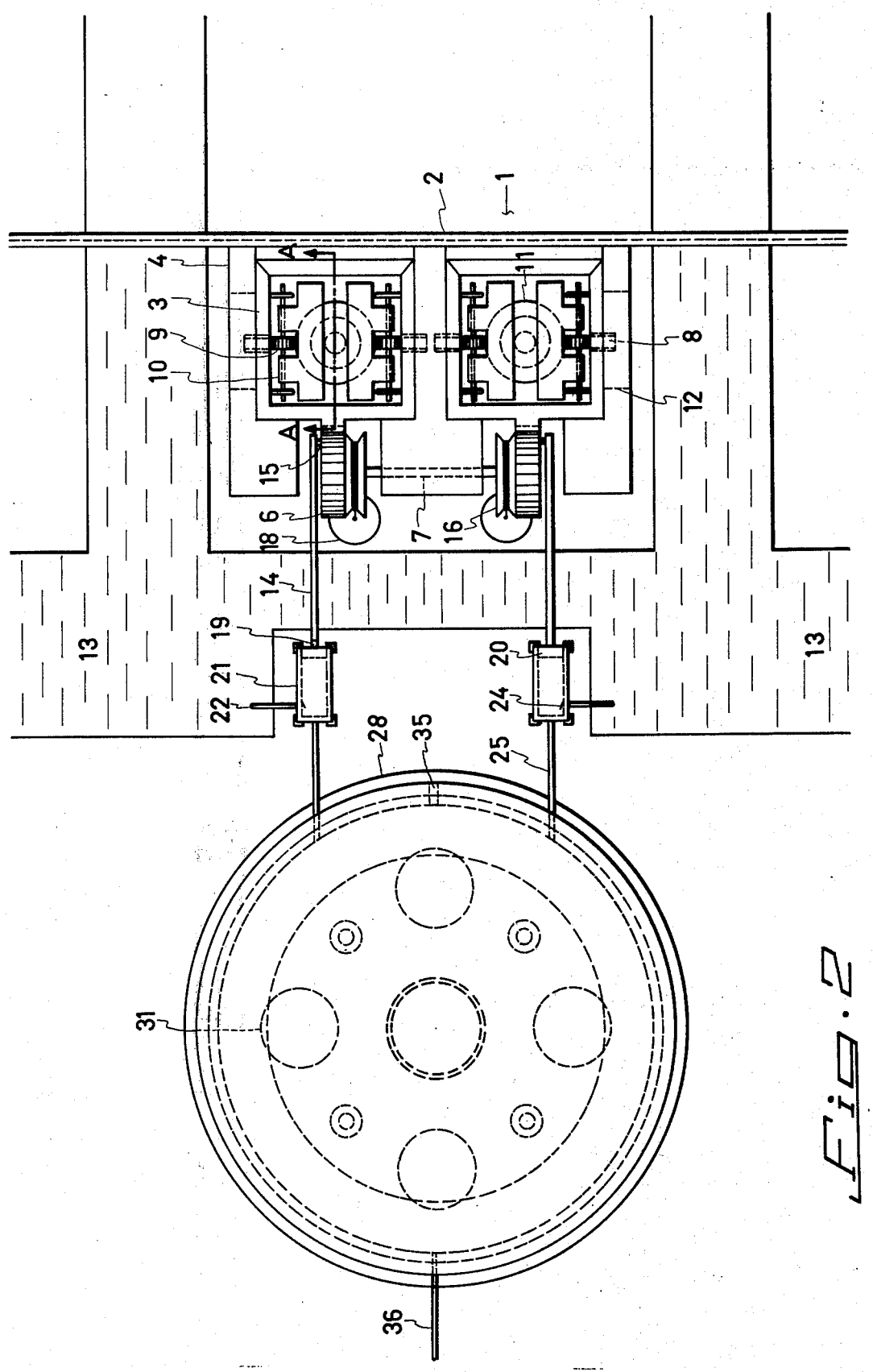

MECHANISM FOR TAPPING THE SURF ENERGY

This invention relates a mechanism to be built on a suitable seashore for tapping the energy of the surf thereof. The primary object of the invention is to provide a means to tap the energy of the surf and to store the energy in a huge energy storage tank in the form of potential energy for later usage in driving various machineries, including generator, A further object of the invention is to provide, despite the pulsating nature of the energy input, a steady and controllable energy output making possible the uniform revolution of machinery driven by the energy. The uniformity of revolution is important in any case, and of particular importance in case the machinery driven is a generator, as this means the uniformity of the frequency of the output electricity. A still further object of the invention is to provide a mechanism for said purpose with a relatively simple construction, yet of such strength and ruggedness so as to be able to withstand the hard wear to which it is subjected. A still further object is to provide a mechanism for said purpose which may be constructed economically and conveniently and operated efficiently and automatically.

BRIEF DESCRIPTION OF THE DRAWING

In the drawing, wherein the same parts have been designated by the same reference characters throughout, FIG. 1 is a front view of the mechanism.

FIG. 2 is a plain view of the mechanism.

FIG. 3 is a sectional view of the gravitation bucket taken along the line A—A shown in FIG. 2

DETAILED DESCRIPTION

In the drawing. 1 is a surf guiding slope extending into the sea. Its inclination with the horizontal is an acute angle, and it is of a suitable height so that it will not hinder the flow of surf water into the gravitation bucket. 2 is a coarse screen to prevent such thing as seaweed from entering the gravitation bucket 3. The gravitation bucket 3 is vertically slidably mounted on a stand 4. One side of the gravitation bucket carries a rack 5 which is in engagement with a transmission gearwheel 6 rotatably mounted on an axle 7 on the stand 4. The stand 4 is a stand with a central recess along which the gravitation bucket may move vertically (two central recesses in case two gravitation buckets are used). At a certain height on each of the right wall and left wall (as viewed along direction A in FIG. 1) of the recess. A hole is provided to receive a retractable plug of the gravitation bucket. Referring to FIG. 3 which is a sectional view of the gravitation bucket taken along the line A—A shown in FIG. 2. 8 is a retractable plug of a trip gear designed to hold the gravitation bucket at its topmost position until the bucket is filled with water. The plugging end of the retractable plug is made hard and smooth, preferably coated with enamel to reduce friction. The other end of the retractable plug is shaped into a rack which is meshed with a cog 9 mounted by suitable means on the wall of the gravitation bucket. The cog 9 is rigidly connected to a float 10 which, when being lifted by the buoyance of water as the bucket is filled with surf water, will turn the cog 9 to pull out the retractable plug 8, allowing the gravitation bucket to fall under the action of gravitational force. A pair of such trip gears are provided for each gravitation bucket. As the gravitation bucket falls to its lower limit, a valve 11 formerly closing a big draining hole of the bucket is lifted to allow rapid draining of the water from the bucket through a hole 12 in the wall of the stand into a pool 13. The water is reserved there for later usage.

Surplus water is allowed to flow back to the sea through a ditch. As the gravitation bucket is still falling, the rack 5 will turn the transmission gearwheel 6 in clockwise direction, pushing a piston rod 14 which is attached to the transmission gearwheel 6 with a pivot 15. Rigidly incorporated with the transmission gearwheel 6 is a pulley 16 on which a cord 17 holding a weight 18 is wound. The weight 18 is slightly heavier than the drained gravitation bucket and the cord 17 is so wound that when the loaded gravitation bucket is falling under gravitation force, the weight will be lifted up and when the gravitation bucket has been drained, the weight will turn the transmission gearwheel anticlockwise, lifting the empty gravitation bucket upwards to its upper limit where it is locked by the retractable plugs 8 actuated by the weight of the floats 10 until it is once more filled with surf water. The anticlockwise rotation of the transmission gearwheel will pull the piston rod 14 outwards. With the speed of falling, draining and rising of the gravitation bucket timed to suit the frequency of the surf, the continual beating of the surf will cause a reciprocative motion of the piston rod 14. The end of piston rod is connected with a pivot 19 to a piston 20 of a reciprocating pump 21 with an inlet pipe 22 having an inflow valve 23 at its nearer end and a filter 24 at its outer end, and with an outlet pipe 25 having a valve 26 at its outer end permitting the one-way flow of water into a large tank 27. Thus the reciprocative motion of the piston 20 will draw water from the pool 13 and force it under pressure into a large tank 27 which is designated as energy storage tank according to its function. The energy storage tank possesses a strong cylindrical concrete wall 28 with an inner lining 29 of a hard and smooth material such as enamel or stainless metal or other material with small frictional coefficient. The tank is basically a huge cylinder having a huge piston 30 provided with several disc-shaped pads 31 to keep the piston body from touching the bottom of the tank so that the piston, even at its lower limit, will not hinder the inflow of water. The huge piston 30 is equiped with piston ring 32 to ensure its close contact with the tank wall. Rigidly connected to the huge piston is a huge piston rod designated as piston column 33. A load 34 is rigidly attached atop the piston column 33 which is also a load by itself. Calibration can be made on the piston column to show the level of water in the energy storage tank. At a suitable height near the top of the energy storage tank, an overflow outlet 35 is provided. When the volume of the gravitation bucket, and thus the volume of water held by it, is of a suitable magnitude, the force acquired from its falling will be adequate to pump water into the energy storage tank, lifting the load in the process. Thus the energy tapped from the surf will be stored in the tank in the form of potential energy. Further input after the energy storage tank has been fully charged may be drained through the overflow outlet 35, An outlet 36 is provided at the base of the tank. Water under pressure may be delivered through the outlet 36 to drive various machineries.

While this description chiefly describes the action of a single gravitation bucket, it is understood that any number of gravitation buckets may be installed to act in parallel to an enchanced effect.

It is further understood that this mechanism is best suited to a shore where the sea leves at ebb tide and that at flood tide do not differ much so that this mechanism may be in function most of the time.

Deviations and changes may be made in details of this invention without departing from the spirit and scope of this invention.

Having thus described my invention, I claim:

1. A mechanism for utilizer energy produced by surf comprising:
a gravitational bucket moveable between upper and lower limits, said bucket receiving water from the surf, normally closed valve means retaining water within said bucket, valve actuating means opening said valve means when said bucket reaches its lower limit of travel in order to discharge water and lighten said bucket, a rack secured to said bucket, a transmission gear wheel meshing with said rack, one end of a piston rod pivoted on said gear wheel, the other end of said piston rod drivingly engaging a reciprocating pump, a pulley rigidly incorporated with said gear wheel, a weight secured to said pulley by cord means wound around the pulley, said weight being heavier than said bucket when empty but lighter than said bucket when full, an energy storage tank communicating with the discharge end of said pump in order to receive fluid discharged by said pump, said tank having a heavy load at the top thereof which is moveable upwardly by fluid entering said tank, whereby said bucket moves up and down driving said gear wheel which reciprocates the piston rod in order to operate said pump and thereby filling the storage tank and lifting the heavy load thus creating a source of potential energy.

2. A mechanism for utilizing energy produced by surf as claimed in claim 1 wherein said gravitational bucket is locked at its upper limit by a pair of trip members each trip member comprising a retractable plug having a rack at one end and at the other end means extending through a wall of said bucket into a stationary member, a cog meshing with said rack at one end of said plug, a float rigidly connected through a lever to the cog and actuating the trip member by its buoyance when the gravitational bucket is filled with water in order to retract the plug, and actuating the trip member to lock the gravitational bucket at its upper limit when said bucket has been drained and lifted to that position.

3. A mechanism for utilizing energy produced by surf as claimed in claim 1 wherein said normally closed valve is at the bottom of the gravitational bucket.

4. A mechanism for utilizing energy produced by surf as claimed in claim 1 wherein said heavy load is a weight.

* * * * *